May 12, 1942. G. H. DUMOND 2,282,995
FISHING REEL
Filed May 11, 1940 5 Sheets-Sheet 4
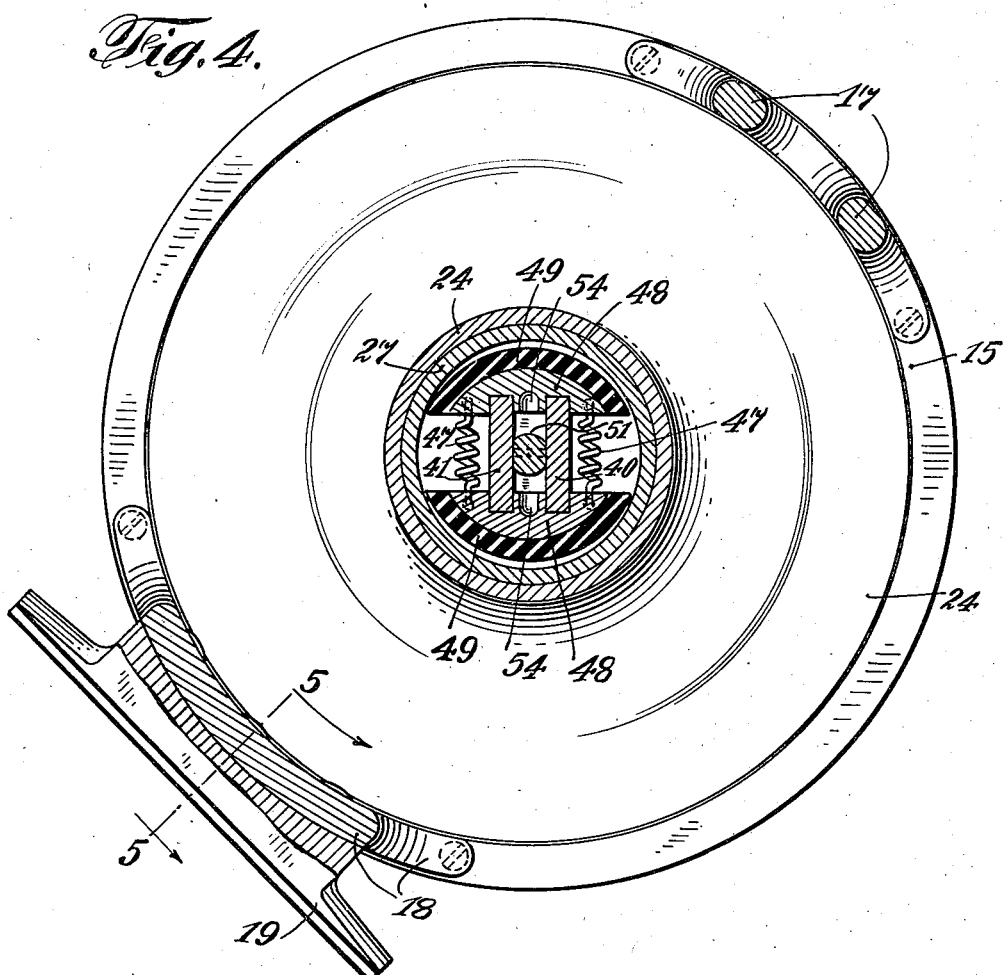
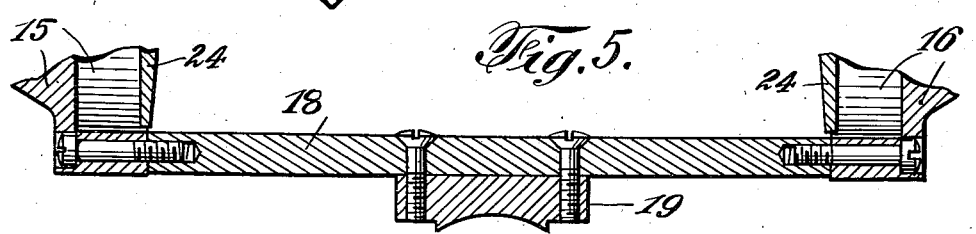
INVENTOR
George H. Dumond
BY
his ATTORNEY

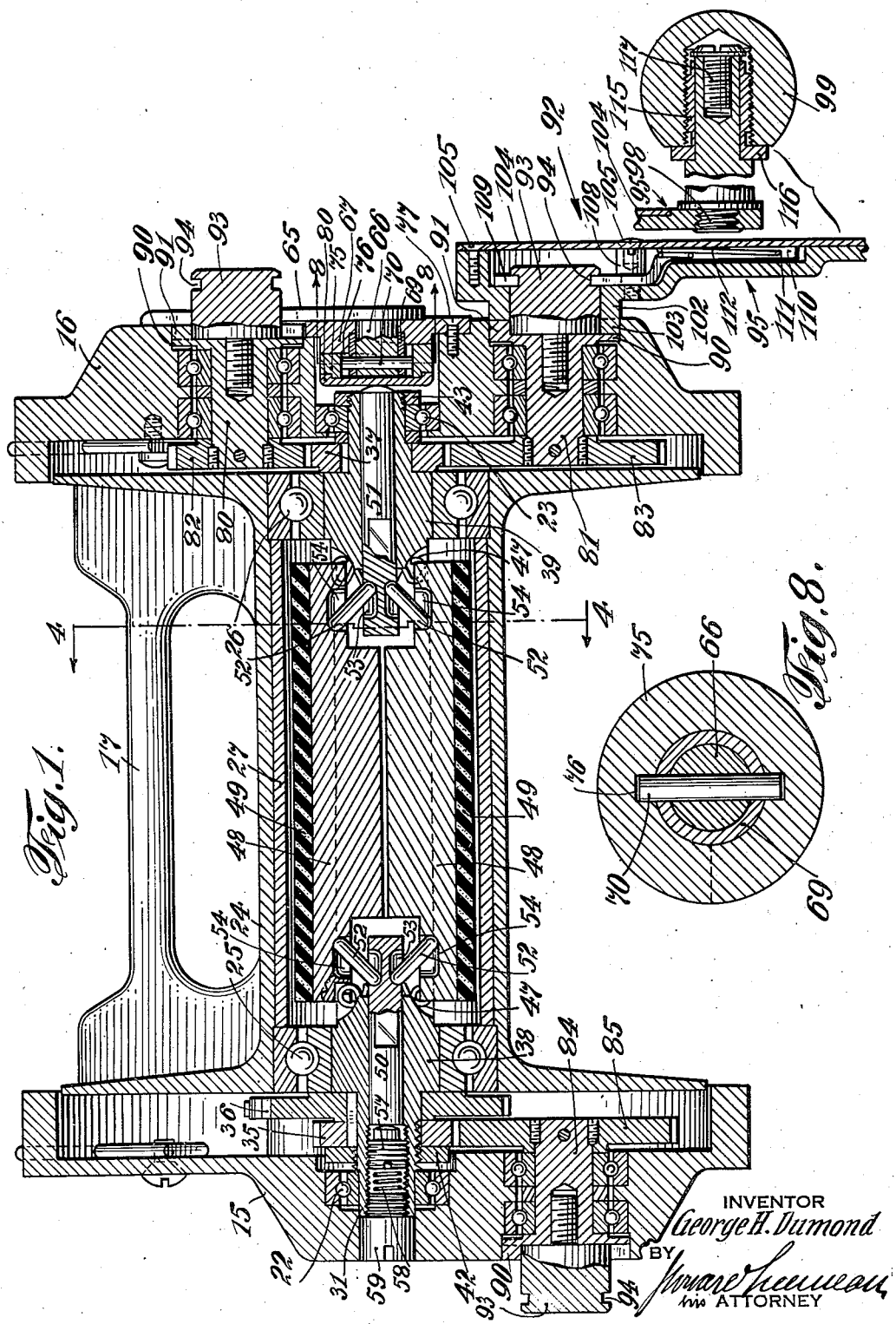

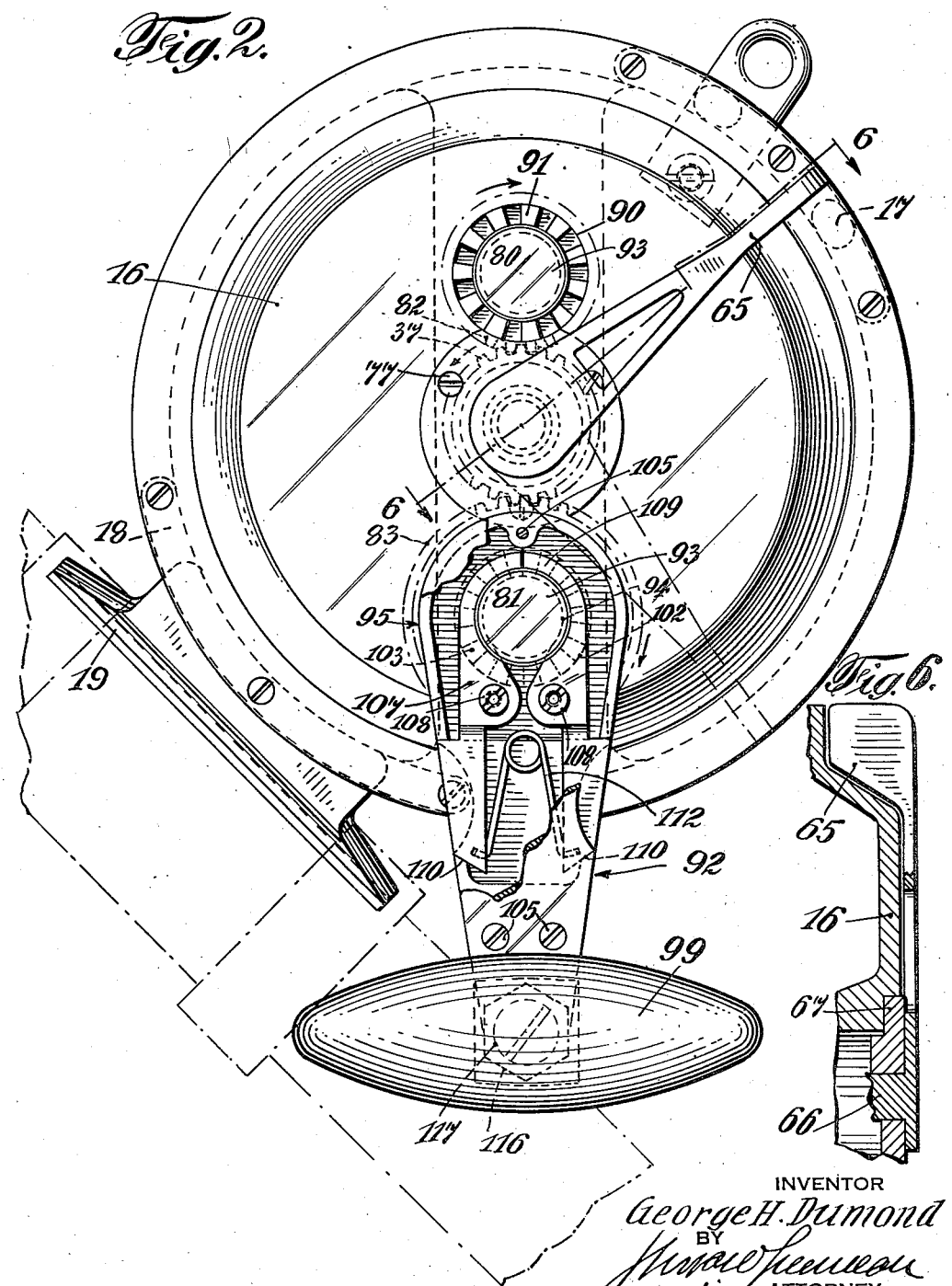

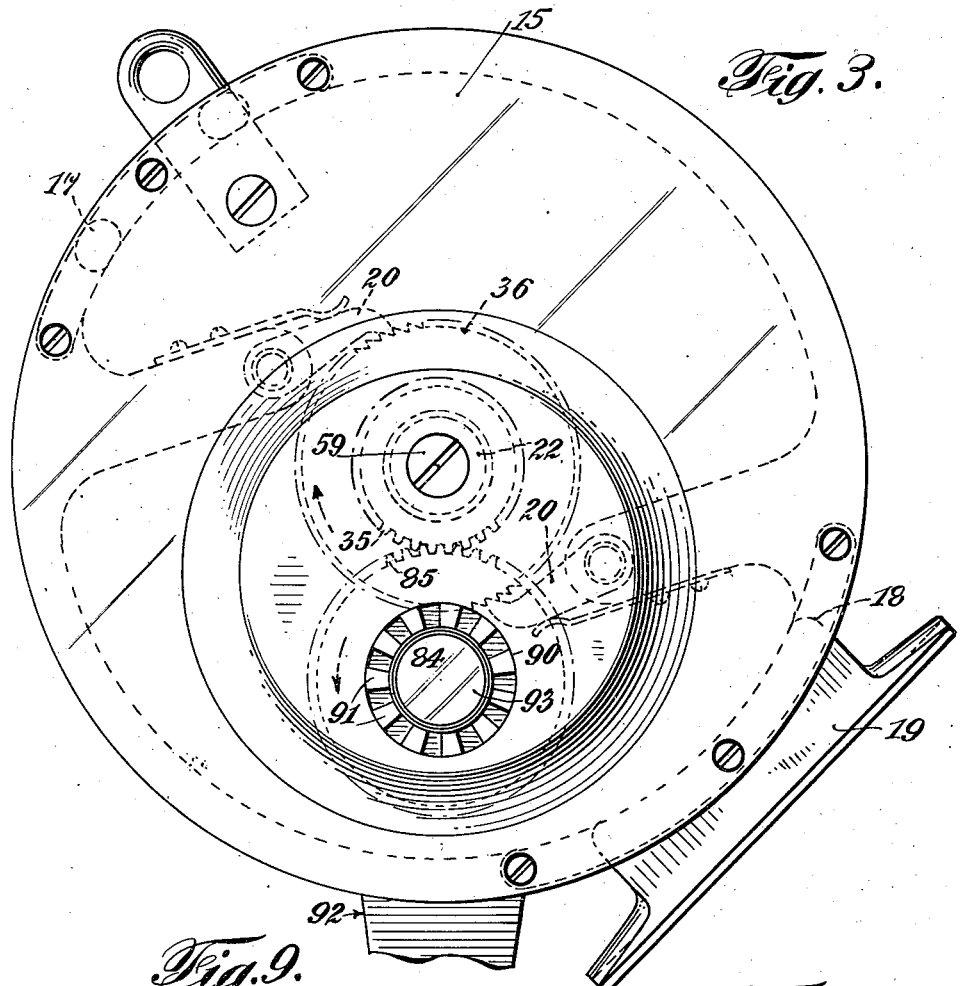
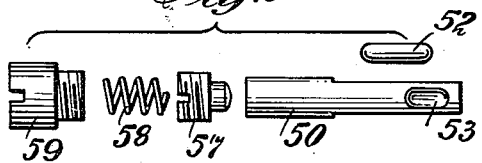
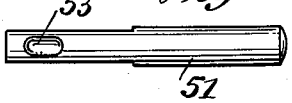
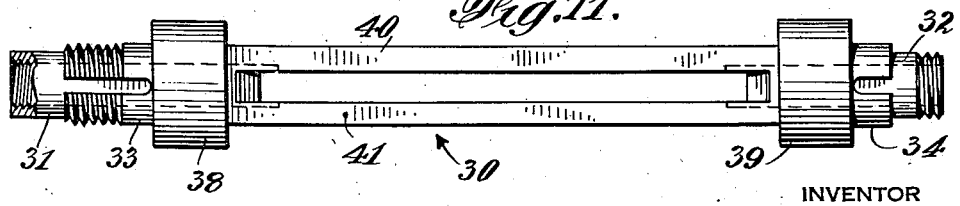

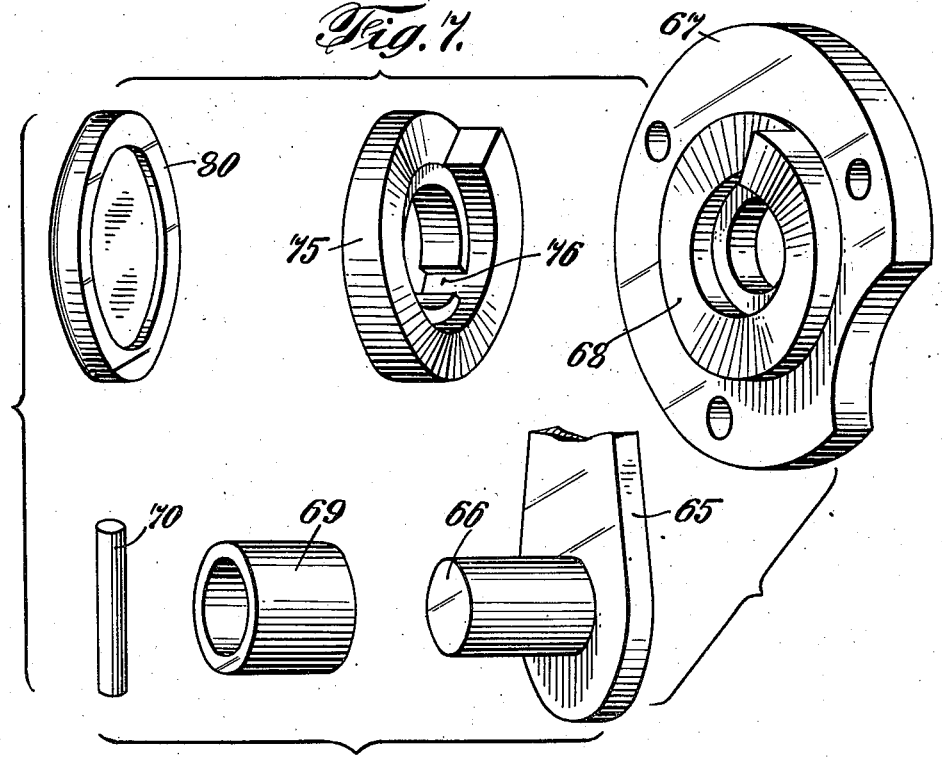
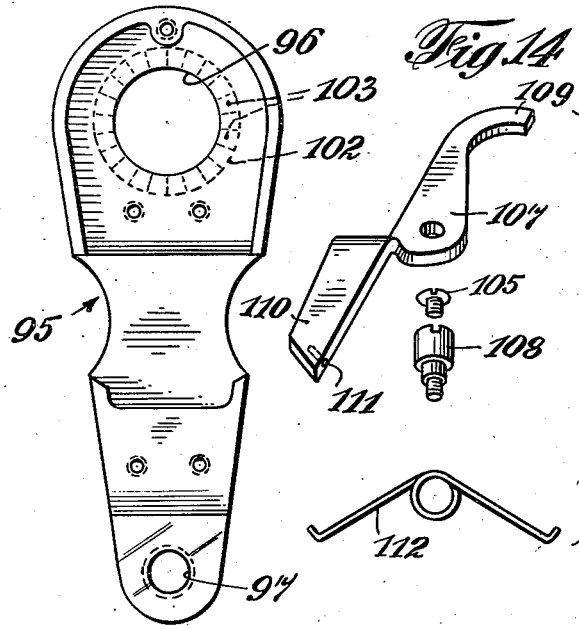
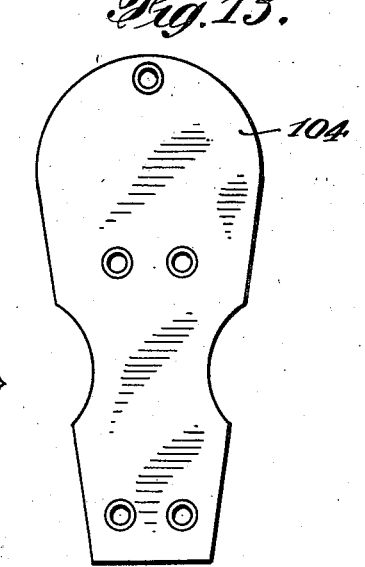

Patented May 12, 1942

2,282,995

UNITED STATES PATENT OFFICE 2,282,995

FISHING REEL

George H. Dumond, Jersey City, N. J.

Application May 11, 1940, Serial No. 334,491

7 Claims. (Cl. 242—84.5)

This invention relates to fishing reels, more particularly those of the type used in fishing for tuna, marlin, and other large game fish, although not restricted thereto.

One of the principal objects of the invention is to provide a fishing reel which can be adjusted so as to allow the line to run out freely or under any desired degree of tension, the braking being automatic after the necessary adjustment has been made and operable only to retard line running out, the line drum being freely rotatable when turned in the direction necessary to wind the line up thereon.

According to the present invention the drum is mounted for rotation in either direction about a shaft capable of rotation in one direction only, that direction being the one in which line is wound up on the drum. A friction clutch, which can also serve as a brake, is provided between the drum and the shaft which can be set so as to be wholly out of engagement, to provide for free running of the drum in either direction, or so as to couple the two together until the pull on the line exceeds a predetermined amount when slippage occurs, to allow line to pay out when a fish makes a strike or a hard run.

A further object of the invention is to provide a fishing reel having simple, effective means for coupling and uncoupling the line drum from the operating handle.

Another object of the invention is to provide a fishing reel which can be used by a left-handed person as well as by a right-handed one.

A further object of the invention is to provide a fishing reel having more than one speed.

Other objects and advantages of the invention will be pointed out in connection with the description of one embodiment of the invention illustrated, by way of example, in the accompanying drawings, wherein:

Figure 1 is a longitudinal central section through the reel;

Figure 2 is an end view of the same from the right-hand side;

Figure 3 is an end view of the same from the left-hand side;

Figure 4 is a section on the line 4—4 of Figure 1;

Figure 5 is a section on the line 5—5 of Figure 4;

Figure 6 is a section through the clutch handle on the line 6—6 of Figure 2;

Figure 7 is a disassembled view of the cam parts operated by the clutch and brake handle and associated parts;

Figure 8 is a section on the line 8—8 of Figure 1;

Figures 9, 10, and 11 are detail views of the clutch and brake expanding means;

Figure 12 is a front view of the crank portion of the handle;

Figure 13 is a front view of the cover plate for the crank portion of the handle; and Figure 14 is a disassembled view of the means for locking the handle to one or other of the driving spindles of the fishing reel.

The fishing reel comprises two end portions 15 and 16 connected together at one side by a frame 17 which serves not only to unite and hold the ends in proper spaced relation but also to act as a handle by which the reel can be carried. The end portions are connected at the other side by a frame 18 which carries a reel seat 19 by which the reel may be secured to the rod, in well-known manner.

Two spring-pressed pawls 20 are provided for preventing the shaft 30 turning in the direction in which the drum turns when line is running out. The drum and shaft are designed so as to be frictionally coupled together, as will be described later.

Journalled in these end portions by means of ball bearings 22 and 23 is a rotatable member of complex structure, the basic parts of which are shown in Figures 9, 10, and 11. Around this rotatable member is the drum 24 on which the line is wound. Ball-bearings 25 and 26 permit the drum to rotate freely in either direction whenever such rotatable member and drum are not frictionally coupled together.

The rotatable member comprises a shaft 30 having ends 31 and 32 on which are mounted the inner races for the ball bearings 22 and 23. Adjacent these ends are portions 33 and 34 formed with keyways for the purpose of non-rotatably securing gear 35, ratchet wheel 36 and gear 37 to the shaft 30. Nuts 42 and 43 hold these gear and ratchet wheels in position. Inside these keyed portions are bosses 38 and 39 on which are mounted the inner races for the ball bearings 25 and 26. Connecting these bosses are two spaced rectangular bars 40, 41. On either side of these bars are two brake shoes 48, 48 of segmental cross-section, and recessed along their opposing faces to receive the edges of the bars 40 and 41. To the outer faces of these shoes an asbestos brake lining 49 is fixed. When the shoes are forced outwardly by means to be described later, their linings 49 contact with and frictionally grip the lining 27 of the drum 24.

After the desired amount of line has been run out, the shoes are brought into frictional engagement with the drum with a pressure determined by the desired braking effort on the line. For example, the frictional drag of the brake-shoes on the drum may be adjusted so that if the tension on the line, due to a fish's striking or making a hard run, exceeds, say, 50 lbs., the drum will slip over the brake shoes permitting line to run out under a constant steady tension. As soon as the run of the fish has lost its intensity and the tension in the line drops below 50 lbs., the rotation of the drum ceases and the fisherman can start winding in his fish.

In the free-running adjustment of the reel, the shoes are held out of contact with the drum by two pairs of springs 47 resiliently connecting the shoes together at their ends. For forcing the shoes outwardly two rods 50 and 51 are mounted for axial movement within the ends of shaft 30. These rods are of somewhat larger diameter than the space between the bars 40 and have their opposing ends cut away along opposite sides to fit such space, as shown in Figures 4, 9 and 10. So constructed, they can slide axially with respect to the shaft but cannot turn therein.

To ensure equality of pressure between the brake-linings 49 and the lining 27 of the drum, various means may be employed. One simple method is to provide a series of pins 52, one end of each of which rests in a recess 53 in one or other of the rods 50, while the other end of each pin rests in a recess 54 in one of the brake shoes 48, as shown in Figure 1. It will be evident that if the rod 51 is moved inwardly and the rod 50 is held stationary, the pins will force the brake shoes outwardly. The rod 50 is held in adjusted position by a threaded plug 57 engaging the interior of the end of the shaft 30. This plug is prevented from vibrating and turning during the use of the reel by a spring 58 compressed against it by another threaded plug 59.

The mechanism for moving the rod 51 inwardly is shown more particularly in Figures 1 and 7. Mounted on the end of a clutch and brake handle 65 is a stub-shaft 66. That shaft is passed through a disk 67 having a spiral cam 68 formed on its inner face. The inner diameter of the cam is larger than the hole through the disk to receive one end of an oil-less bearing sleeve 69. When the parts described have been assembled, a hole is drilled through the projecting part of the shaft 66 and sleeve 69 for a pin 70. The next step is to slide over the end of the sleeve 69 an annular cam 75 having diametrically oppositely arranged key-ways 76 to receive the projecting ends of the pin 70 (Figure 1) and thereby cause the cam 75 to turn with the shaft 66. A cap 80 fits over the end of the cam 75, sleeve 69 and shaft 66 and bears centrally against the end of the rod 51. The periphery of the disk 67 is rigidly attached to the end portion 16 of the reel by screws 77, so that the cam 68 is stationary. By turning the shaft 66 by its handle 65 the cam 75 is rotated relatively to the cam 68 and, as a result, the cam 75, cap 80 and rod 51 are moved axially inwards to force the shoes 48 outwardly to grip the inner face of the sleeve 27.

The end portion 16 has journalled therein two stub-shafts 80 and 81. The shaft 80 has mounted thereon a gear 82 of the same diameter as and in mesh with the gear 37. The shaft 81 carries a gear 83 larger than the gear 37 with which it is in mesh to multiply the rotation of the shaft 30. Likewise the end portion 15 has journalled therein a stub-shaft 84 carrying a gear 85 in mesh with the gear 36.

The shaft 30 may be turned by rotating any one of the three stub-shafts 80, 81, and 84, the first two are for right-handed persons and the last for left-handed ones. At its outer end, each stub-shaft is formed with a flange 90, having a series of teeth 91 (Figure 2) on its outer face for engagement with a similar series of teeth on the crank 92 by which the reel is operated. Centrally mounted on each stub-shaft is a boss 93 which fits into an aperture in the crank 92. This boss is provided with a peripheral groove 94 to receive the locking means by which the crank is detachably secured to the boss.

The construction of the crank is shown more particularly in Figures 1, 12, 13, and 14. It comprises a casting 95 having at one end an aperture 96 to receive one or other of the bosses 93 and, at the other end, a threaded hole 97 for the spindle 98 on which the handle 99 is mounted. Around the aperture 96 is a laterally extending flange 102 having teeth 103 formed therein to mesh with the teeth 91. A cover-plate 104 is secured to the casting 95 by screws 105. Between the casting and cover-plate are two locking members 107 rotatably mounted on pivot pins 108. One end 109 of each member 107 is curved to fit the groove 94 in one or other of the stubshafts. The other ends 110 of these members are apertured at 111 for the ends of a spring 112 which resiliently holds the ends 110 apart. If, however, the ends 110 are pressed together by the fingers, the other ends 109 will be separated sufficiently to disengage them from the groove 94 and permit the crank to be slid off the boss 93. To permit such operation both the casting 95 and the cover plate 104 have cutaway parts along their sides. Normally the outer margins of the ends 110 and those of the casting and cover plate on either side of such cutaway parts lie in the same straight line.

The spindle 98 has rotatably mounted thereon an externally threaded sleeve 115 having a hexagonal flange 116 at its inner end. After the sleeve has been slipped onto the spindle 98 the retaining screw 117 is put in place to hold the sleeve in position. The handle 99 is then screwed onto the sleeve until it presses firmly against the flange 116.

The handle 99 is elongated laterally with respect to the axis about which it turns, instead of longitudinally, as is usually the case. With the form of construction shown, it is not necessary to turn the wrist to bring the back of the hand uppermost. The natural position, and hence the one best adapted for exerting power, is with the thumb uppermost and the back of the hand vertical.

What I claim is:

1. A fishing reel for large salt-water game fish, comprising a frame having end portions and members rigidly connecting said portions together, a shaft and a drum rotatably mounted in said frame for independent coaxial rotation, a friction clutch inside the drum for connecting the shaft and drum when desired, a member for operating said clutch carried by the shaft mounted for movement along its axis and means for moving said member comprising two annular cams concentrically arranged with respect to the shaft formed with opposing complementarily formed cam surfaces, one cam being rigidly connected to the reel-frame and the other mounted between the first cam and said member for both axial and rotative movement, and means for turning the second cam to move it and said member axially to bring the clutch into operation.

2. A fishing reel for large salt-water game fish, comprising a shaft, a handle for rotating the shaft, a drum mounted coaxially with the shaft for free rotation in either direction, a plurality of symmetrically arranged brake-shoes non-rotatably mounted on the shaft between the shaft and the central portion of the drum, and toggle means operable independently of said handle for pressing both ends of each of the brake-shoes radially outwards with substantially uniform pressure throughout their length against the interior of the drum for connecting the shaft and drum when desired.

3. A fishing reel for large salt-water game fish, comprising a shaft, a handle for rotating the shaft, a drum mounted coaxially with the shaft for free rotation in either direction, a plurality of symmetrically arranged brake shoes non-rotatably, but radially and axially movably mounted on the shaft between the latter and the central portion of the drum, brake expanding means adjacent each end of the brake shoes and means operable independently of said handle for moving one of said means in the direction of the axis of the shaft relatively to the other to force the brake shoes outwardly against the interior of the central portion of the drum for connecting the shaft and drum when desired.

4. A fishing reel for large salt-water game fish, comprising a shaft, a handle for rotating the shaft, a drum mounted coaxially with the shaft for free rotation in either direction, a plurality of symmetrically arranged brake shoes non-rotatably, but radially and axially movably mounted on the shaft between the latter and the central portion of the drum, swingable thrust members adjacent each end of the brake shoes each having one end bearing against the shaft and the other end bearing against one of the brake shoes, and means operable independently of said handle for moving the shaft-bearing ends of one set of said members in the direction of the axis of the shaft relatively to the other to force the brake shoes outwardly against the interior of the central portion of the drum for connecting the shaft and drum when desired.

5. A fishing reel, for large salt-water game fish, comprising a frame, a shaft mounted thereon for rotation in one direction only, a handle for rotating the shaft in such direction, a drum mounted coaxially with the shaft for free rotation in either direction, a friction clutch brake within the central part of said drum for connecting the shaft and drum when desired, a clutch applying member carried by and slidable longitudinally with respect to the shaft, an abutment fixedly mounted on the reel frame in line with the shaft, a cam between said abutment and the end of said clutch applying member to force the latter longitudinally of the shaft to apply the clutch, and means for moving said cam relatively to said abutment.

6. A fishing reel, for large salt-water game fish, comprising a frame, a shaft mounted thereon for rotation in one direction only, a handle for rotating the shaft in such direction, a drum mounted coaxially with the shaft for free rotation in either direction, a friction clutch brake within the central part of said drum for connecting the shaft and drum when desired, a clutch applying member carried by and slidable longitudinally with respect to the shaft having a projecting end concentric with said shaft, an abutment fixedly mounted on the reel frame in line with said shaft, a clutch controlling member rotatably and slidably mounted on said frame and having a part located between said end and said abutment, said end and abutment having coacting cam surfaces constructed so that by turning the clutch controlling member the latter is forced against said end to apply the clutch.

7. A fishing reel, for large salt-water game fish, comprising a frame, a shaft mounted thereon for rotation in one direction only, a handle for rotating the shaft in such direction, a drum mounted coaxially with the shaft for free rotation in either direction, a friction clutch brake within the central part of said drum for connecting the shaft and drum when desired, a clutch applying member carried by and slidable longitudinally with respect to the shaft and having an axially disposed projecting end, a clutch-adjusting member mounted on the reel frame for rotation about the axis of said shaft having a central part adapted to bear against said end, a circular cam fixedly mounted on the reel frame concentric with respect to said shaft adapted to engage said clutch-adjusting member and force the latter against said end to apply the clutch when said clutch-adjusting member is turned, and means for turning said last-mentioned member.

GEORGE H. DUMOND.